US011112634B1

(12) United States Patent
Zhang

(10) Patent No.: US 11,112,634 B1
(45) Date of Patent: Sep. 7, 2021

(54) SUBSTRATE AND DISPLAY DEVICE

(71) Applicant: TCL CHINA STAR OPTOELECTRONICS TECHNOLOGY CO., LTD., Guangdong (CN)

(72) Inventor: Yu Zhang, Guangdong (CN)

(73) Assignee: TCL CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/972,012

(22) PCT Filed: May 18, 2020

(86) PCT No.: PCT/CN2020/090812
§ 371 (c)(1),
(2) Date: Dec. 4, 2020

(30) Foreign Application Priority Data

Apr. 7, 2020 (CN) .......................... 202010264313.3

(51) Int. Cl.
*G02F 1/1333* (2006.01)
*G02F 1/1335* (2006.01)
*G02F 1/1337* (2006.01)

(52) U.S. Cl.
CPC ...... *G02F 1/133308* (2013.01); *G02F 1/1337* (2013.01); *G02F 1/133345* (2013.01); *G02F 1/133502* (2013.01); *G02F 1/133514* (2013.01)

(58) Field of Classification Search
CPC ......... G02F 1/133308; G02F 1/133345; G02F 1/133502; G02F 1/1337; G02F 1/133514
See application file for complete search history.

(56) References Cited

U.S. PATENT DOCUMENTS

| 2003/0063249 | A1* | 4/2003 | Hoshino | G02F 1/136286 349/149 |
| 2009/0147169 | A1* | 6/2009 | Kim | H01L 29/42384 349/43 |
| 2010/0020402 | A1 | 1/2010 | Imura et al. | |
| 2014/0160395 | A1* | 6/2014 | Park | G02F 1/133526 349/61 |
| 2019/0369450 | A1* | 12/2019 | Tsuchiya | G02F 1/133526 |
| 2020/0249519 | A1* | 8/2020 | Ai | G02F 1/133345 |

FOREIGN PATENT DOCUMENTS

| CN | 101512388 A | 8/2009 |
| CN | 108376041 A | 8/2018 |
| CN | 110082977 A | 8/2019 |

* cited by examiner

*Primary Examiner* — Jessica M Merlin

(57) ABSTRACT

A substrate and a display device are disclosed. The substrate includes a glass substrate; a gate insulation layer disposed on a surface of the glass substrate; a functional layer disposed on a surface of the gate insulation layer; an alignment layer disposed on a side of the functional layer; and an insertion layer disposed between the functional layer and the alignment layer; wherein a refractive index of the functional layer is $n_3$, a refractive index of the alignment layer is $n_5$, a refractive index of the insertion layer is $n_4$, and $n_3 > n_4 > n_5$.

14 Claims, 1 Drawing Sheet

SUBSTRATE AND DISPLAY DEVICE

FIELD OF INVENTION

The present disclosure relates to the field of display, and in particular, to a substrate and a display device.

BACKGROUND OF INVENTION

A polymer stabilized-vertical alignment (PSVA) technique enables liquid crystal display panels to have advantages, such as rapid response times and high transmittance, and the PSVA technique is characterized by forming polymer protrusions on surfaces of alignment films, thereby causing pretilt angles of liquid crystal molecules.

With development of display screens, resolution is required to increase gradually. Since the higher the resolution is, the lower the transmittance is, the increase of the resolution causes the decrease of the transmittance. How to increase the transmittance under a constant aperture ratio has become a difficult problem for display panel manufacturers. Generally, for liquid crystal display (LCD) display screens, brightness of L255 is mainly affected by the aperture ratio. Although workers in this industry propose many solutions to improve the aperture ratio, increasing the transmittance as much as possible under the constant aperture ratio still becomes the difficult problem.

SUMMARY OF INVENTION

Technical Problem

A technical problem about a substrate with considerably low transmittance under a constant aperture ratio exists in conventional display devices.

Technical Solutions

The present disclosure provides a substrate and a display device to solve the technical problem about the substrate with the considerably low transmittance under the constant aperture ratio existing in the conventional display devices.

In order to solve the above-mentioned problem, in a first aspect, the present disclosure provides a substrate including:

a glass substrate;

a gate insulation layer disposed on a surface of the glass substrate;

a functional layer disposed on a surface of the gate insulation layer away from the glass substrate;

an alignment layer disposed on a side of the functional layer away from the gate insulation layer; and an insertion layer disposed between the functional layer and the alignment layer;

wherein a refractive index of the functional layer is $n_3$, a refractive index of the alignment layer is $n_5$, a refractive index of the insertion layer is $n_4$, and $n_3 > n_4 > n_5$.

In some embodiment of the present disclosure, a refractive index of the glass substrate is $n_1$, a refractive index of the gate insulation layer is $n_2$, and $n_1 < n_2 < n_3$.

In some embodiment of the present disclosure, a refractive index of material of the insertion layer is $1.6 \leq n_4 \leq 1.9$.

In some embodiment of the present disclosure, material of the insertion layer is an insulation material which is at least one of aluminium oxide, beryllium oxide, and magnesium oxide.

In some embodiment of the present disclosure, the insertion layer is a single film layer which is made up of a single material.

In some embodiment of the present disclosure, the insertion layer is a composite film layer which is made up of multiple layers of material.

In some embodiment of the present disclosure, the insertion layer includes a first film layer near a side of the functional layer and a second layer near a side of the alignment layer, and a refractive index of the first film layer is greater than a refractive index of the second film layer.

In some embodiment of the present disclosure, the functional layer is a passivation layer, and the substrate is an array substrate.

In some embodiment of the present disclosure, the functional layer is an indium tin oxide layer, and the substrate is a color filter substrate.

In a second aspect, the present disclosure further provides a display device including an array substrate and a color filter substrate both of which include a substrate, and the display device includes:

a glass substrate;

a gate insulation layer disposed on a surface of the glass substrate;

a functional layer disposed on a surface of the gate insulation layer away from the glass substrate;

an alignment layer disposed on a side of the functional layer away from the gate insulation layer; and an insertion layer disposed between the functional layer and the alignment layer;

wherein a refractive index of the functional layer is $n_3$, a refractive index of the alignment layer is $n_5$, a refractive index of the insertion layer is $n_4$, and $n_3 > n_4 > n_5$.

In some embodiment of the present disclosure, a refractive index of the glass substrate is $n_1$, a refractive index of the gate insulation layer is $n_2$, and $n_1 < n_2 < n_3$.

In some embodiment of the present disclosure, a refractive index of material of the insertion layer is $1.6 \leq n_4 \leq 1.9$.

In some embodiment of the present disclosure, material of the insertion layer is an insulation material which is at least one of $Al_2O_3$, BeO, and MgO.

In some embodiment of the present disclosure, the insertion layer is a single film layer which is made up of a single material.

In some embodiment of the present disclosure, the insertion layer is a composite film layer which is made up of multiple layers of material.

In some embodiment of the present disclosure, the insertion layer includes a first film layer near a side of the functional layer and a second layer near a side of the alignment layer, and a refractive index of the first film layer is greater than a refractive index of the second film layer.

In some embodiment of the present disclosure, the functional layer is a passivation layer, and the substrate is an array substrate.

In some embodiment of the present disclosure, the functional layer is an indium tin oxide layer, and the substrate is a color filter substrate.

Advantageous Effects

Compared to conventional substrates, the present disclosure reduces a difference of refractive indexes between adjacent film layers by adding one or more insertion layers between the functional layer and the alignment layer, thus decreasing entire reflectance of the substrate, so that more light is not reflected but passes through the substrate to increase the transmittance of the display device.

DESCRIPTION OF DRAWINGS

In order to clearly illustrate technical solutions in embodiments of the present disclosure, the drawings required for using in the description of the embodiments are briefly described below. Obviously, the drawings in the following description are only some of the embodiments of the present disclosure. For those skilled in the art, other drawings may also be obtained in accordance with these drawings without making for creative efforts.

DETAILED DESCRIPTION OF PREFERRED EMBODIMENTS

In combination with accompanying drawings in embodiments of the present disclosure below, technical solutions in the embodiments of the present disclosure are clearly and completely described. Obviously, the described embodiments are merely a part of the embodiments of the present disclosure, rather than all the embodiments. Based on the embodiments in the present disclosure, all of other embodiments obtained by those skilled in the art without making for creative efforts belong to the scope protected by the present disclosure.

In the description of the present disclosure, it should be understood that indicative directions or position relations, such as terms "center", "longitudinal", "transverse", "length", "width", "thickness", "upper", "lower", "front", "back", "left", "right", "vertical", "horizontal", "top", "bottom", "inner", "outer", "clockwise", and "counterclockwise", are based on directions or position relations indicated by the accompanying drawings. The indicative directions or position relations are only for convenience of describing the present disclosure and simplifying the description, and do not indicate or imply that indicated devices or elements must have a specific orientation and be constructed and operated in a specific orientation. Therefore, the indicative directions or position relations cannot be understood to be limitation to the present disclosure. In addition, terms, such as "first" and "second", are only used for purposes of description, and do not be understood to indicate or imply relative importance or to imply numbers of indicated technical features. Thus, the features defined with "first" and "second" may explicitly or implicitly include one or more of the features. In the description of the present disclosure, term "a plurality of" means two or more than two, unless specified otherwise.

In conventional technical solutions, increasing transmittance as much as possible under a constant aperture ratio becomes a difficult problem.

According to Fresnel equation: $R=(n_1-n_2)^2/(n_1+n_2)^2$, $T=1-R=(4n_1n_2)/(n_1+n_2)^2$, R means reflectance of incident light, T means transmittance of incident light, and $n_1$ and $n_2$ respectively mean refractive indexes of different film layers adjacent to each other.

It can be understood from the equation that on the premise that other parameters are constant, the smaller the difference of the refractive indexes between the adjacent film layers is, the lower the reflectance is; moreover, the lower the reflectance is, the higher the transmittance is. Therefore, if the transmittance of the display panel requires to be increased, the difference of the refractive indexes between the adjacent film layers has to be controlled.

Based on the above description, embodiments of the present disclosure provide a substrate and a display device. The details are described below.

Figure 1:
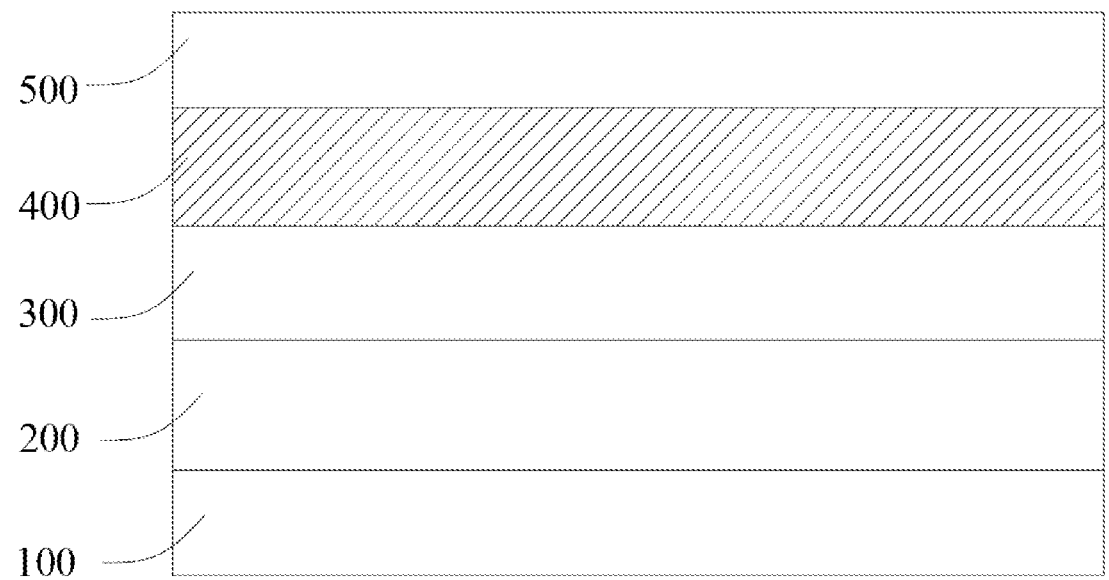
FIG. 1 is a structural schematic view of a substrate in an embodiment of the present disclosure.

Firstly, the embodiments of the present disclosure provide a substrate, as shown in FIG. 1 which is a structural schematic view of the substrate in an embodiment of the present disclosure. The substrate includes a glass substrate 100, a gate insulation layer 200 disposed on a surface of the glass substrate 100, a functional layer 300 disposed on a surface of the gate insulation layer 200 away from the glass substrate 100, an alignment layer 500 disposed on a side of the functional layer 300 away from the gate insulation layer 200, and an insertion layer 500 disposed between the functional layer 300 and the alignment layer 500. A refractive index of the functional layer 300 is $n_3$, a refractive index of the alignment layer 500 is $n_5$, a refractive index of the insertion layer 400 is $n_4$, and $n_3 > n_4 > n_5$.

Compared to conventional substrates, the present disclosure reduces the difference of the refractive indexes between the adjacent film layers by adding one or more insertion layers 400 between the functional layer 300 and the alignment layer 500, thus decreasing entire reflectance of the substrate, so that more light is not reflected but passes through the substrate to increase the transmittance of the display device.

Based on the above-mentioned embodiment, in another embodiment of the present disclosure, as shown in FIG. 1, a refractive index of the glass substrate 100 is $n_1$, a refractive index of the gate insulation layer 200 is $n_2$, and $n_1 < n_2 < n_3$. Since a side of the glass substrate 100 away from the gate insulation layer 200 contacts air, a refractive index $n_0$ of the air to visible light under a standard state can be regarded as nearly 1, and the $n_1$, the $n_2$, and the $n_3$ are greater than 1, $n_0 < n_1 < n_2 < n_3$ is set to cause the steady variation of the refractive index between the adjacent film layers and reduce the difference of the refractive indexes between the adjacent film layers as much as possible, thereby decreasing the reflectance of the substrate and increasing the transmittance of the display device.

In a specific embodiment, the refractive index $n_1$ of the glass substrate 100 is 1.52, the refractive index $n_2$ of the gate insulation layer 200 is 1.9, the refractive index $n_3$ of the functional layer 300 is 1.91, and the refractive index $n_4$ of the alignment layer 500 is 1.6. After calculation, $R1=(1.91-1.6)^2/(1.91+1.6)^2 \approx 0.8\%$.

In this embodiment, the insertion layer 400 with the refractive index $n_4$ is introduced, $n_4$ conforms $1.6 \leq n_4 \leq 1.9$. When $n_4$ is within this range, the reduction of the difference of the refractive indexes between the adjacent film layers may be achieved. Preferably, the insertion layer 400 is a BeO layer with 1.75 refractive index. After the insertion layer 400 is introduced, the calculation of subtracting the refractive index of the alignment layer 500 from the refractive index of the functional layer 300 requires to consider the effect of a thickness between the film layers. In this embodiment, $R2 \approx 0.4\%$ is obtained by calculation, thereby achieving the purposes about decreasing the refractive index and increasing the transmittance.

In order not to affect the electrical performance of the substrate, the insertion layer 400 employs an insulation material which preferably is at least one of aluminium oxide ($Al_2O_3$), beryllium oxide (BeO), and magnesium oxide (MgO). It should be understood that this case is merely a preferred solution, and in actual production, not only limited to the above-mentioned material. Other material meeting the requirement of the refractive index may also be used.

Generally, the introduced insertion layer 400 is a single film layer which is made up of a single material, and is sufficient to improve the refractive index and the transmittance of the substrate. However, in order to make the effect significant, the introduced insertion layer 400 may be a composite film layer made up of multiple layers of material.

Figure 2:
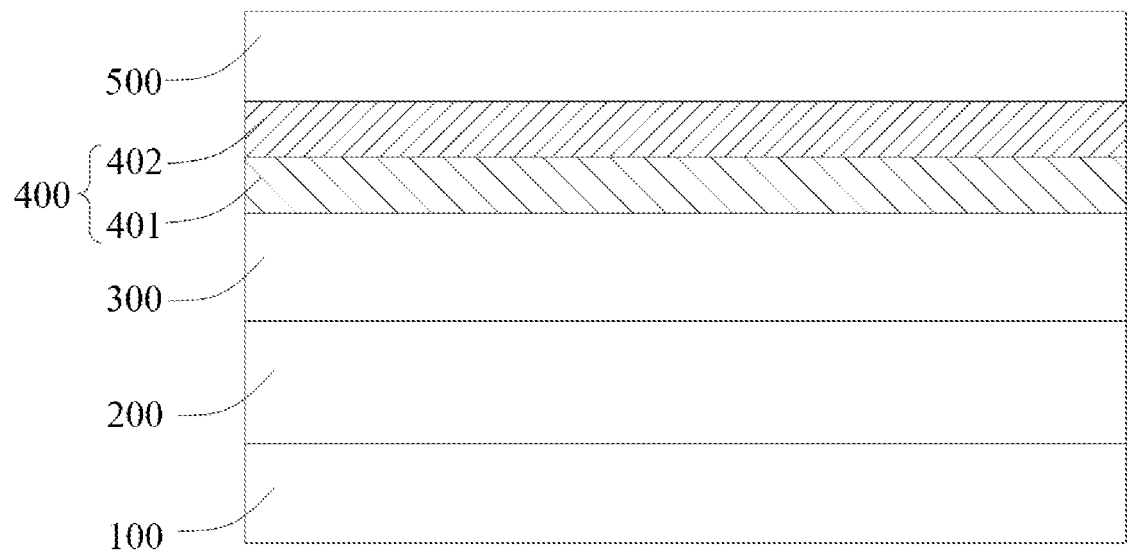
FIG. 2 is a structural schematic view of a substrate in an embodiment of the present disclosure.

In another embodiment of the present disclosure, as shown in FIG. 2 which is a structural schematic view of a substrate in an embodiment of the present disclosure. The insertion layer 400 includes a first film layer 401 near a side of the functional layer 300 and a second layer 402 near a side of the alignment layer 500, and a refractive index $n_{41}$ of the first film layer 401 is greater than a refractive index $n_{42}$ of the second film layer 402.

The refractive index $n_1$ of the glass substrate 100 is 1.52, the refractive index $n_2$ of the gate insulation layer 200 is 1.9, the refractive index $n_3$ of the functional layer 300 is 1.91, and the refractive index $n_4$ of the alignment layer 500 is 1.6. Preferably, material of the first film layer 401 is MgO, and the refractive index $n_{41}$ is 1.8; material of the second film layer 402 is $Al_2O_3$, and the refractive index $n_{42}$ is 1.7. As described in the above-mentioned embodiment, after calculating, R3≈0.8% and R4≈0.25% are obtained, so that the effect is considerably significant in terms of the reduction of the reflectance.

It is worth mentioning that in the above-mentioned embodiments, the limitation to the material of the insertion layer 400 is to achieve the reduction of the difference of the refractive indexes between the adjacent film layer. The specific material and a range of the refractive index of the insertion layer 400 may be flexibly changed.

In some embodiment of the present disclosure, the functional layer 300 is a passivation layer, and the substrate is an array substrate.

In some embodiment of the present disclosure, the functional layer 300 is an indium tin oxide layer, and the substrate is a color filter substrate.

In order to effectively practice the substrate in the embodiments of the present disclosure, based on the substrate, the embodiments of the present disclosure further provide a display device. The display device includes an array substrate and a color filter substrate both of which include the substrate as described in the above-mentioned embodiments. The performance of the display device is further improved by employing the substrate as described in the above-mentioned embodiments.

In the foregoing embodiments, the description for the embodiments emphasizes different aspects. A part without being described in detail in a certain embodiment may refer to the detailed description in other embodiments and is no longer described in detail here. When the embodiments are specifically practiced, the above elements or structures can be implemented as independent entities, or they can be combined in any way to be implemented as the same or several entities. The specific implementation of the above elements or structures can refer to the foregoing methods and embodiments and is no longer described in detail here.

The embodiments of the present disclosure are introduced in detail above. Specific examples herein are used to explain the principles and the implementation of the present disclosure. The illustration of the foregoing embodiments is only used to facilitate understanding the technical solutions and the core ideas of the present disclosure. Moreover, for those skilled in the art, according to the ideas of the present disclosure, the specific implementation and the application range can be modified. In summary, the content of the specification should not be construed as the limitation to the present disclosure.

What is claimed is:

1. A substrate, comprising:
   a glass substrate;
   a gate insulation layer disposed on a surface of the glass substrate;
   a functional layer disposed on a surface of the gate insulation layer away from the glass substrate;
   an alignment layer disposed on a side of the functional layer away from the gate insulation layer; and
   an insertion layer disposed between the functional layer and the alignment layer, wherein the insertion layer is a composite film layer which is made up of multiple layers of material;
   wherein a refractive index of the functional layer is $n_3$, a refractive index of the alignment layer is $n_5$, a refractive index of the insertion layer is $n_4$, and $n_3 > n_4 > n_5$.

2. The substrate according to claim 1, wherein a refractive index of the glass substrate is $n_1$, a refractive index of the gate insulation layer is $n_2$, and $n_1 < n_2 < n_3$.

3. The substrate according to claim 1, wherein a refractive index of material of the insertion layer is $1.6 \leq n_4 \leq 1.9$.

4. The substrate according to claim 1, wherein material of the insertion layer is an insulation material which is at least one of aluminium oxide, beryllium oxide, and magnesium oxide.

5. The substrate according to claim 1, wherein the insertion layer includes a first film layer near a side of the functional layer and a second layer near a side of the alignment layer, and a refractive index of the first film layer is greater than a refractive index of the second film layer.

6. The substrate according to claim 1, wherein the functional layer is a passivation layer, and the substrate is an array substrate.

7. The substrate according to claim 1, wherein the functional layer is an indium tin oxide layer.

8. A display device including an array substrate and a color filter substrate, wherein the array substrate includes a substrate comprising:
   a glass substrate;
   a gate insulation layer disposed on a surface of the glass substrate;
   a functional layer disposed on a surface of the gate insulation layer away from the glass substrate;
   an alignment layer disposed on a side of the functional layer away from the gate insulation layer; and
   an insertion layer disposed between the functional layer and the alignment layer, wherein the insertion layer is a composite film layer which is made up of multiple layers of material;
   wherein a refractive index of the functional layer is $n_3$, a refractive index of the alignment layer is $n_5$, a refractive index of the insertion layer is $n_4$, and $n_3 > n_4 > n_5$.

9. The display device according to claim 8, wherein a refractive index of the glass substrate is $n_1$, a refractive index of the gate insulation layer is $n_2$, and $n_1 < n_2 < n_3$.

10. The display device according to claim 8, wherein a refractive index of material of the insertion layer is $1.6 \leq n_4 \leq 1.9$.

11. The display device according to claim 8, wherein material of the insertion layer is an insulation material which is at least one of aluminium oxide, beryllium oxide, and magnesium oxide.

12. The display device according to claim 8, wherein the insertion layer includes a first film layer near a side of the functional layer and a second layer near a side of the alignment layer, and a refractive index of the first film layer is greater than a refractive index of the second film layer.

13. The display device according to claim 8, wherein the functional layer is a passivation layer.

14. The display device according to claim 8, wherein the functional layer is an indium tin oxide layer.

* * * * *